US009280672B2

(12) United States Patent
Manchala et al.

(10) Patent No.: US 9,280,672 B2
(45) Date of Patent: Mar. 8, 2016

(54) METHOD FOR SECURE PRODUCTION PRINTING

(75) Inventors: Daniel W. Manchala, Torrance, CA (US); Steven J. Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 2151 days.

(21) Appl. No.: 12/352,759

(22) Filed: Jan. 13, 2009

(65) Prior Publication Data

US 2010/0177358 A1 Jul. 15, 2010

(51) Int. Cl.
*G06F 21/60* (2013.01)

(52) U.S. Cl.
CPC ................... *G06F 21/608* (2013.01)

(58) Field of Classification Search
None
See application file for complete search history.

(56) References Cited

U.S. PATENT DOCUMENTS

| 5,629,980 | A | 5/1997 | Stefik et al. |
| 5,634,012 | A | 5/1997 | Stefik et al. |
| 5,715,403 | A | 2/1998 | Stefik et al. |
| 6,236,971 | B1 | 5/2001 | Stefik et al. |
| 6,985,249 | B2 | 1/2006 | Klassen et al. |
| 7,031,015 | B2 | 4/2006 | Vidyanand |
| 2003/0043402 | A1 | 3/2003 | Manchala et al. |
| 2003/0189725 | A1* | 10/2003 | Kloosterman et al. ........ 358/1.18 |
| 2005/0024672 | A1* | 2/2005 | Guster et al. ................. 358/1.14 |
| 2005/0190273 | A1* | 9/2005 | Toyama et al. .............. 348/231.5 |
| 2005/0219665 | A1* | 10/2005 | Mino ............................. 358/537 |
| 2008/0016353 | A1* | 1/2008 | Carro ............................ 713/171 |
| 2009/0319468 | A1* | 12/2009 | Miyata ............................ 707/1 |

* cited by examiner

*Primary Examiner* — Ming Hon
(74) *Attorney, Agent, or Firm* — Basch & Nickerson LLP (57) ABSTRACT

A method for printing a composite document creates a fixed data unit for a composite document, the fixed data unit being a portion of an individual document which is consistent in each individual document within the composite document. A variable data unit is created for each individual document to be represented by the composite document, a variable data unit being a portion of the individual document which is unique to that individual document. The data within each created variable data unit is analyzed to determine a set of rights for each created variable data unit, and the determined set of rights are embedded into the appropriated created variable data unit. A composite document is created by bundling the fixed data unit with the embedded variable data units and submitted for printing. A plurality of individual documents for printing is created, each individual document being a merger of the fixed data unit with an embedded variable data unit wherein each individual document is printed based upon the set of rights embedded in the corresponding variable data unit.

15 Claims, 8 Drawing Sheets

| SELECT | RECORD # | EXPENSES ON CARD | PRIVACY REQUIREMENTS | | |
|---|---|---|---|---|---|
| | | | TELEMARKETING | MAIL | EMAIL |
| + | $R_1$ | $10,200 | N | Y | N |
| | $R_2$ | $5700 | N | N | N |
| | $R_3$ | $8300 | N | Y | N |
| | : | | | | |
| | : | | | | |
| + | $R_k$ | $18,500 | N | Y | N |
| + | $R_{k+1}$ | $16,200 | N | Y | Y |
| | : | | | | |
| | $R_m$ | $300 | N | N | N |

FIG. 5

| RECORD # | PURCHASES | PROMOTIONAL ITEMS (FOR PRINT) | GIFT ITEMS (MAIL FULFILLMENT) |
|---|---|---|---|
| $R_1$ | VIDEO EQUIPMENT | ADS FOR VIDEO ACCESSORIES & VENDORS | FLASH DRIVE |
| $R_k$ | AUTOMOBILE | ADS FOR SERVICES, OIL CHANGE COUPONS & VENDORS OFFERING SERVICE | KEY CHAIN |
| $R_{k+1}$ | CONSTRUCTION MATERIAL | SPECIAL DISCOUNTS FOR ADDITIONAL PURCHASES | PEN |

FIG. 6

| # | NAME | P | ADDRESS | P | EXPENSES ON CARD | P | PREVIOUS PAYMENTS | P | MAIN PURCHASES |
|---|---|---|---|---|---|---|---|---|---|
| R₁ | JOE BLACK | Y | 1211 EL SEGUNDO, PALO ALTO | Y | $10,200 | Y | $5,600 | Y | VIDEO EQUIPMENT |
| R₂ | DON BROWN | Y | 3115 WEBSTER AVE, AUSTIN | N | $5,700 | N | $1,000 | N | TRAVEL-AIRLINE |
| R₃ | JOHN DOE | Y | 1815 TOYOTA ST., GARDENA | N | $8,300 | N | $7,200 | N | TRAVEL-HOTEL |
| .. | | | | | | | | | |
| .. | | | | | | | | | |
| Rₖ | MATT KING | Y | 406 WESTERN, CARSON | Y | $18,500 | N | $10,300 | Y | AUTOMOBILE |
| Rₖ₊₁ | SILVER RIC | Y | 311 YORKSHIRE, NEW YORK | Y | $16,200 | Y | $19,700 | N | CONSTRUCTION EQUIP. |
| .. | | | | | | | | | |
| Rₘ | GOLD JUMP | Y | 112 ANZA, HERMOSA BEACH | N | $300 | N | $1,000 | N | RESTAURANTS |

| # | NAME | P | ADDRESS | P | EXPENSES ON CARD | P | PREVIOUS PAYMENTS | P | MAIN PURCHASES |
|---|---|---|---|---|---|---|---|---|---|
| R1 | JOE BLACK | Y | 1211 EL SEGUNDO, PALO ALTO | Y | $10,200 | Y | $5,600 | Y | VIDEO EQUIPMENT |
| Rk | MATT KING | Y | 406 WESTERN, CARSON | Y | $000000 | N | $10,300 | Y | AUTOMOBILE |
| Rk+1 | SILVER RIC | Y | 311 YORKSHIRE, NEW YORK | Y | $16,200 | Y | $000000 | N | CONSTRUCTION EQUIP. |

PERSONAL INFORMATION 900

NAME ☐ SOCIAL SECURITY NUMBER **********
ADDRESS ☐ DATE OF BIRTH MM/DD/YYYY
CITY ☐ PLACE OF BIRTH **********
ZIP ☐ MOTHER'S MAIDEN NAME **********

FUTURE SPENDING INFORMATION *(HOW LIKELY ARE YOU GOING TO SPEND IN THESE AREAS BASED ON CURRENT SPENDING)*

TRAVEL Y/N ☐
AUDIO/VIDEO Y/N ☐
HOME IMPROVEMENT Y/N ☐
MORTGAGE/REFINANCE Y/N ☐

PREFERRED TRAVEL VENDOR INFORMATION

| VENDOR TYPE | VENDOR NAME | PERSONAL INFORMATION TYPE | PERSONAL INFORMATION | RECEIVE PROMOS? | PROMOTIONALS TYPE |
|---|---|---|---|---|---|
| AIRLINES | ☐ | FREQUENT FLIER MILES | ********** | Y/N ☐ | EMAIL/MAIL |
| HOTEL | ☐ | MILES TAG | MM/DD/YYYY | Y/N ☐ | EMAIL/MAIL |
| RENTAL | ☐ | CODE | ********** | Y/N ☐ | EMAIL/MAIL |
| RESTAURANT | ☐ | CODE | ********** | Y/N ☐ | EMAIL/MAIL |

*FIG. 9*

| # | NAME | P | ADDRESS | P | EXPENSES ON CARD | P | ... | USAGE CONTROL REQUIREMENTS |
|---|------|---|---------|---|------------------|---|-----|----------------------------|
| R1 | JOE BLACK | Y | 1211 EL SEGUNDO, PALO ALTO | Y | $10,200 | Y | | NO RESTRICTIONS |
| R2 | DON BROWN | Y | 3115 WEBSTER AVE, AUSTIN | N | $5,700 | N | | FIELD 6 CAN BE USED AT MOST 3 TIMES |
| R3 | JOHN DOE | Y | 1815 TOYOTA ST., GARDENA | N | $8,300 | N | | FIELD 6 CAN BE USED FOR 6 MONTHS UNLIMITED TIMES |
| .. | | | | | | | | |
| .. | | | | | | | | |
| Rk | MATT KING | Y | 406 WESTERN, CARSON | Y | $18,500 | N | | FIELD 6 NEEDS A PAYMENT OF $1.20 FOR INITIAL PURCHASE; THEREAFTER $0.20 PER USE, NO OTHER RESTRICTION. |
| Rk+1 | SILVER RIC | Y | 311 YORKSHIRE, NEW YORK | Y | $16,200 | Y | | |
| .. | | | | | | | | |
| Rm | GOLD JUMP | Y | 112 ANZA, HERMOSA BEACH | N | $300 | N | | FIELD 4 IS HELD PRIVATE. PRINT FACILITY TO CONTACT END CONSUMER. |

METHOD FOR SECURE PRODUCTION PRINTING

BACKGROUND AND SUMMARY

Production printers are used to print transactional data like bills and statements. The generation of such transactional data is usually done by generating a base document that contains the fixed or common part of the material to be printed and a variable data part containing the unique or specific information that is relevant to each document to be printed. Examples of such printing are very common, for example, monthly credit card bills.

Often the producer of the transactional data would like to include extra materials along with the bill or other documents. For example, a credit card company may desire to print bill statements as well as related promotional material and mail the packets to its customers. The credit card company's database of its customers may contain information as to who has ordered high valued or a large number of goods. Therefore, the credit card company may decide to print the bills for those customers, as well as tailored promotional material, on special glossy paper in color and using an expensive process that includes printing on a high end color printer. The printed material may also be mailed out using some speedier delivery systems like overnight delivery. Such extra processing is more expensive than the standard processing.

In many cases, the generator of a production printing document and the facility that prints and distributes the document may be separate facilities of the same organization or even separate companies. Even if the document is printed locally with respect to the generator of the document, both are interested in ensuring that only the more expensive processing is done only for those customers that meet some set of criteria.

An additional effect of the generation of documents like those described above is that the printing facility may acquire a significant amount of data from the variable data associated with documents being submitted for printing. If the printing facility were to save this data, it would have the ability to generate additional documents, using the variable data from the documents submitted to it, to target certain people with directed promotional material. Alternatively, the generator of the documents may not include the actual variable data in the document, but instead give the printing facility access to its database that contains the variable data.

This data accumulation or access capability may be used to the advantage of the customers of the printing facility as well as the facility itself. However, the originators of the data need to be assured that the data is only used in ways that the originators desire. Furthermore, it is often necessary to ensure that the data, which may contain private information about customers of the data originator, is properly protected in terms of customer privacy.

Both of these issues center on the ability to control the usage of sets of data that may be associated with another document, or may be separate. The control issues affect both the generators and/or original owners of the data and any subsequent entities that acquire the data.

BRIEF DESCRIPTION OF THE DRAWING

The drawings are only for purposes of illustrating various embodiments and are not to be construed as limiting, wherein.

DETAILED DESCRIPTION

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

Figure 1:
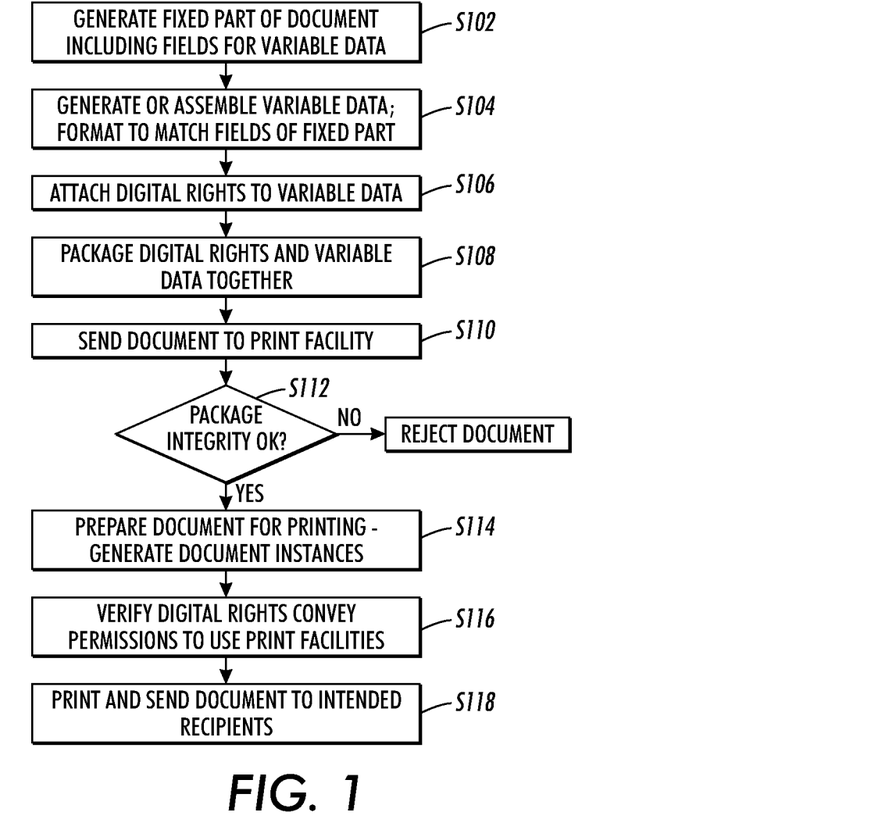
FIG. 1 illustrates an overview of a rights management process that controls use of resources in a production printing environment.

FIG. 1 illustrates an overview of a way to control the use of resources in a production printing process. The production printing process is used to generate a large number of multiple individualized documents each of which contains a common part and also a part that is unique to each separate document. The documents to be printed contain a fixed data part and a variable data part.

The fixed data part contains the basic format of the multiple documents to be generated. For example, if the multiple documents are monthly bills, the fixed data part contains the basic format of the bill and the information such as headers and logos and such that are part of every bill to be printed. The fixed data part also contains information that controls the placement of the variable data.

The variable data part may contain information that is unique to each document. For example, a letter may include the letterhead and logo in the fixed data part, but the name and address of the intended recipient may be in the variable data part.

Referring to FIG. 1, in step S102, the fixed data part of the document is generated. This step includes generating both the information to be printed on each of the final document instances and the metadata that indicates the type and location of the variable data that is to be printed on each document instance. This metadata is often referred to as the "fields" in the document. The fields contain information identifying the location of the data to be printed and possibly also formatting information to the control of the appearance of the final printed document.

In step S104, a set of individual data is generated or gathered as the variable data part of the document to be printed. This includes the document specific data that is to be printed in each field of the final document set. The individual data may be attached to the document or alternatively a reference to the data which may allow the printing facility to access it remotely may be included instead.

In step S106, the individual data part of the document has a set of digital rights attached to it. These rights may include such things as: permissions to use expensive or restricted document preparation devices, permissions to use special media mailing options, or similar processes. The digital rights may additionally include billing or other purchasing data to allow the printing facility to directly charge for the usage of any special equipment or materials.

In step S108, the combined individual data and digital rights are packaged together. This packaging can take the form of some sort of encryption process. For example, the entire package could be encrypted using a conventional encryption algorithm and a checksum appended to the encrypted package.

This packaging allows the digital rights to be directly associated only with the intended data and cannot be removed or added to other data. Thus, the packaging step allows both the producer of the document and the printer of the document to use the individual data in the intended fashion.

In step S110, the combined document, consisting of the fixed data part of the document and the packaged variable data and associated digital rights part of the document is sent to the printing facility.

At the printing facility, in step S112, the variable data package is examined to ensure that the package integrity has been maintained. Once this verification takes place, the package can be disassembled so that the printing facility can use the variable data.

In step S114, the document is prepared for printing. The fixed data part of the document is used to generate individual instances of the document by filling the fields in the fixed data part of the document with the data from the variable data portion of the document.

In addition, at step S114, any specialized printing or production resources are identified. The specialized printing or production resources might include some special form of processing like full color printing, or special media, or priority mailing. This preparation may also include segregation and separation of the individual document instances to facilitate the usage of particular production facilities. For example, all the document instances that use full color printing might be batched together for processing all at once.

In step S116, the digital rights are used to ensure that each document instance is entitled to use the resources needed to produce it. This process may include verification or extra payment information.

Finally, in step S118, the document instances are generated and sent to the intended recipients.

It will be seen that the process described in FIG. 1 enables the generator of the document and the printing facility to both be sure that any specialized or expensive resources are used with permission.

The digital rights may spell out the conditions under which a particular document instance may use limited or restricted resources. In general, the digital rights may include a set of logic conditions that define the conditions needed to make the associated resources available.

Figure 2:
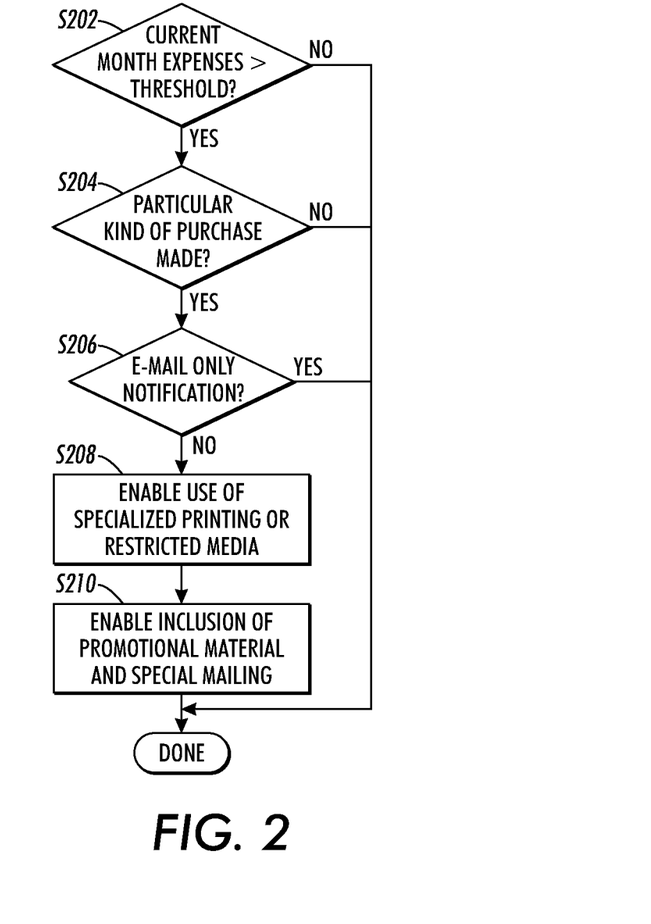
FIG. 2 illustrates a method of selecting certain documents for specialized processing.

FIG. 2 shows how such a set of rights specifications might operate. As illustrated in FIG. 2, in step S202, the variable data for a document instance is first checked to see if the customer's expenses for the month exceed a threshold value. This allows the generator of the document to utilize the extra expense of the limited resources for those potential customers whose spending habits indicate a likelihood of success.

If this condition is met, at step S204, the variable data is checked to see if the customer has purchased a specific type of equipment that indicates that the customer is likely to be interested in purchasing the particular item being advertised or promoted via the special processing.

If this condition is met, the final check, in step S206, verifies that this customer has not chosen e-mail only notification, since these customers are not interested in receiving printed matter from the originator of the document When all three conditions are met, in step S208, the attached digital rights are used to authorize the use of the specialized resources that are needed to produce the special document. Those documents that do not meet the rights specifications are printed in a normal fashion without recourse to special equipment, media, mailing, or similar extensions.

In step S210, the rights are also used to direct this document instance for special handling that includes the inclusion of some special form of promotional material and perhaps expedited mailing.

As an example of how such a process might be applied, consider the example of a credit card company that wishes to send promotional material that is tailored to each customer's interests and previous buying habits. Suppose, for example, that the credit card company wishes to identify those customers who might be interested in purchasing high end video equipment. The credit card company decides to identify those customers as those whose monthly expenses have exceeded $10,000, who have also bought video equipment, and who have not requested e-mail only notification. The credit card company might package a set of digital rights with the bills that take the form of a set of if-then conditions imposed on the variable data. All document instances that meet the conditions are then enabled to print using a higher quality full color printing process, on special media, and to add a special promotional item in the mailing.

Figure 3:
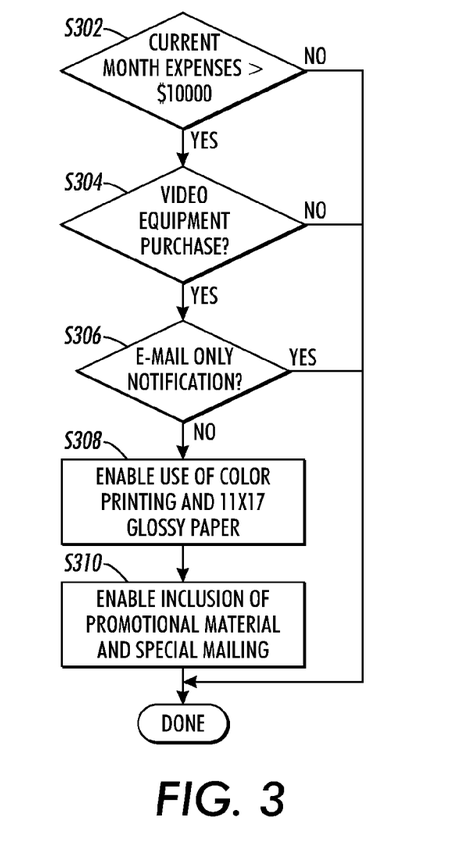
FIG. 3 shows a particular instance of the method of FIG. 2.

FIG. 3 shows, in flowchart form, how such a set conditions might be implemented. For the example, in FIG. 3, the logic might be expressed as follows in Table 1:

TABLE 1

If (the customer's credit card expenses for the month) > $10,000
and (if the customer purchased electronic items that play video)
and (if the customer has not requested e-mail notifications)
Then (select promotional material related to video accessories)
and (select promotional material related to video in classics category)
and (use a color printer to print the promotional material)
and (use 11 × 17 glossy paper)
and (use a 1-fold and center staple)
and (package with gift material during mail fulfillment)
and (use $1^{st}$ class mail postage)

In step S302, the variable data for a document instance is first checked to see if the customer's expenses for the month exceed $10,000. If this condition is met, in step S304, the variable data is checked to see if the customer has purchased any video-related equipment. If this condition is met, the final check, in step S306, verifies that this customer has not chosen e-mail only notification.

When all three conditions are met, in step S308, the attached digital rights are used to authorize the use of the high end color printer, with 11×17 glossy paper. The rights also are used to authorize the use of a special folding and stapling process.

In step S310, the rights are also used to direct this document instance for special handling that includes the inclusion of some special form of promotional material and expedited mailing.

Figure 5:
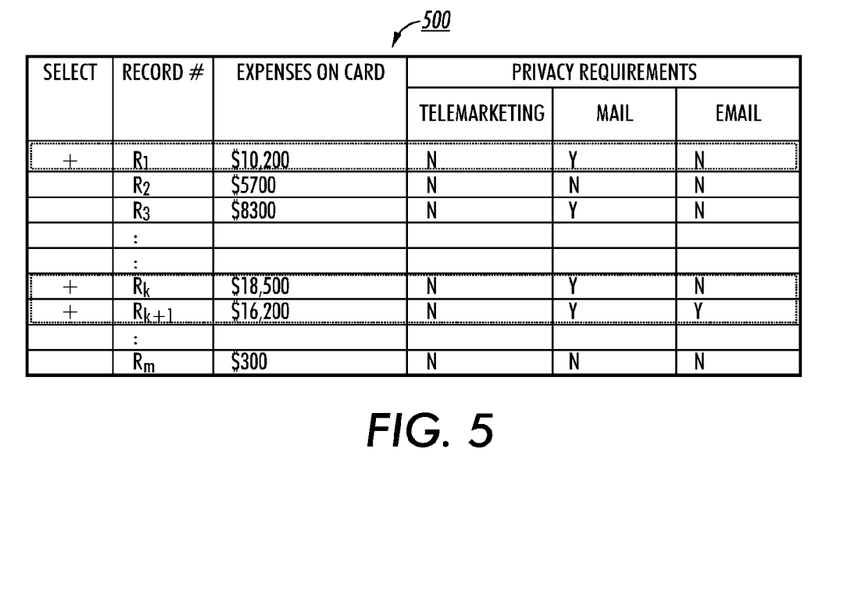
FIG. 5 shows a generic data set of variable data records.

FIG. 5 shows a generic data set of variable data records 500 upon which the example, illustrated by FIG. 3, can process. More specifically, FIG. 5 shows a generic data set of variable data records 500 having 3 records ($R_1$, $R_k$, and $R_{k+1}$) representing customers who spent over $10,000.

Figure 6:
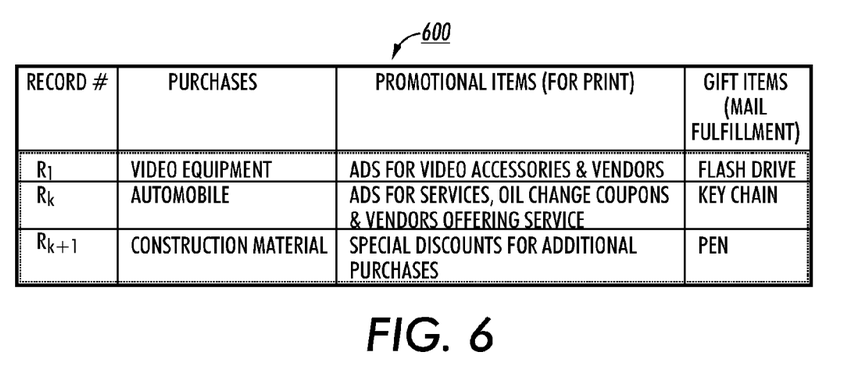
FIG. 6 shows a database of processing parameters for processing a database of variable data records.

FIG. 6 shows a database of records 600 which meet the $10,000 and which met the purchase criteria of video purchase, automotive purchase, and/or construction purchase. Moreover, FIG. 6 shows a database of records 600 wherein the fulfillment (Flash Drive, Key Chain, Pen) and/or promotional material (Flash Drive, Key Chain, and Pen) to accompany the printed document (Ads for video accessories & vendors, Ads for services, oil change coupons & vendors offering service, and Special discounts for additional purchases) are identified.

The above example shows how the usage of digital rights allows both the originator of the document and the printer to be sure that expensive resources are used only when appropriate.

The digital rights attached to the variable data can include more traditional rules such as who is allowed to see the data, what security measures should be taken to safeguard it, and other restrictions and entitlements.

Figure 4:
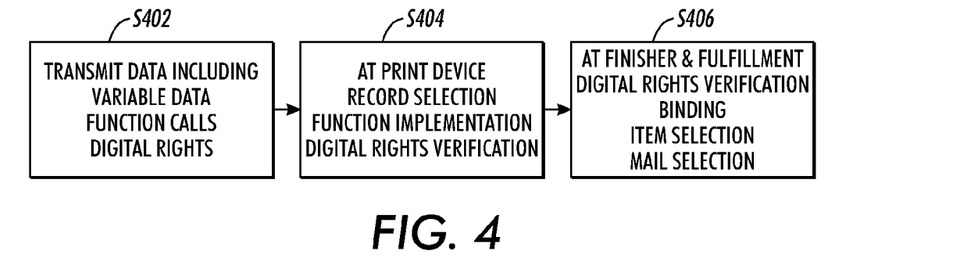
FIG. 4 shows a flowchart of a production printing process.

Often production printing involves a separate language to describe the processing and handling of the print job. FIG. 4 shows in schematic form how the digital rights are used in such a processing environment.

In step S402, the producer of the document generates variable data along with function calls that work on the data for placement of text and figures on the finished documents. Such function calls might be written in a page description language like Postscript™. The function calls can also call for particular media, folding, stapling, and mailing options as needed. These extra function calls are written in a specialized job processing language associated with the printer or printing system being used. The variable data and the function calls have digital rights attached that allow the usage of the required printing resources.

The package of data, function calls, and digital rights are transmitted to the print facility where the package is first processed, in step S404. The print device interprets the function calls to generate the document instances. Either the print device itself or a digital front end processor may perform record selection to select any print instances where the digital rights call for specialized resources. The digital front end processor first verifies that the attached digital rights convey permission to use the requested resources and if the attached digital rights convey permission, the digital front end processor routes the separated document instances to the proper processing element.

Finally, in step S406, the printed material is routed to a finishing and mail fulfillment center or station where further digital rights are verified to release any gift materials or specialized mail delivery.

Digital rights with complex conditions, like those in the example above, could be conveyed using such languages; as XrML (eXtensible rights Markup Language), XACML (eXtensible Access Control Markup Language), ODRL (Open Digital Rights Language); to represent the semantics of such constructs. While these languages provide a rich set of constructs useful for many applications (video, audio, print, and many other general controls), a subset can be used for printing, finishing, and mailing.

Conventionally, variable data is commonly transmitted in clear text ASCII form. However, to prevent alteration of the tag information, the variable data may be sent over an encrypted channel from the document originating entity to the print facility.

Alternately, the entire variable data set could be compressed, encrypted using conventional techniques, and sent to the printing facility. On the other end, the entire variable data set is decrypted first and decompressed. This same technique could be used if the variable data needs to be re-directed to another print facility to accommodate heavy loads, printer failure, cost optimization, etc.

Furthermore, the digital rights can be packaged with the variable data and the combined package encrypted together. This packaging enables the digital rights to remain attached to the data that the digital rights were intended to be attached to and cannot be separated.

The authenticity of the set of rights is verifiable by digitally signing the rights. In other words, a message digest of the rights may be encrypted using the private key of the producer of the document. The corresponding public key is used at the printer to decrypt the message digest and compare the decrypted message to the received rights' computed message digest. The equivalence of the two proves that the producer did ask for the release of resources and made arrangements for payment of them.

Furthermore, if the document originator prints many such documents, the document originator may either directly store the variable data at the print facility or to share access to the data, via network connections, with the print facility. This may limit the amount of data that needs to be transmitted as the document is moved from generation to production. The package can be stored at the printer and used to print the document. Subsequently, the package may be retained and the data used for other purposes than the original printing.

However, such a data sharing allows the print facility to have access to the variable data, which may contain confidential or valuable information. Moreover, the print facility may wish to use the data for purposes of its own.

For example, the print facility might use the credit card data from the previous examples to generate marketing promotions of its own targeted at potential customers selected based on their previous credit card purchases. The credit card company, or in general, the owner of the data may wish to limit any further access, or, if such access is allowed, be able to collect a fee for its use.

For example, a credit card company may send to a printer site a database containing names, addresses and other data about its customers. The printer site may use this database when printing monthly statements. In such a case, the composite document would include a variable data portion that included any monthly expenses and a reference to the name and address data in the database.

The ability to store the data at the print facility may lead to other business opportunities for the print facility. For example, the print facility may use the stored data to sell the ability to perform targeted marketing for entities other than the original owner of the data. Targeted marketing is a process whereby a marketing agency can advertise or offer products and services to those customers whose tastes or prior purchases indicate that those customers would be more likely to purchase the offered products or services.

However, the original owner of the data may want its customers' privacy requirements honored and protected. Furthermore, the original owner may desire payment for the use of its customer data. The attachment of the digital rights to the customer data, which is usually the variable data in the examples above, enables control of both privacy and at the same time may establish a mechanism for tracking usage for payment purposes.

By encrypting certain fields of the variable data, privacy can be ensured. These fields can be tagged to indicate that the fields have been encrypted and therefore are under some sort of usage control requirements. The records themselves are tagged with usage control requirements.

Figure 7:
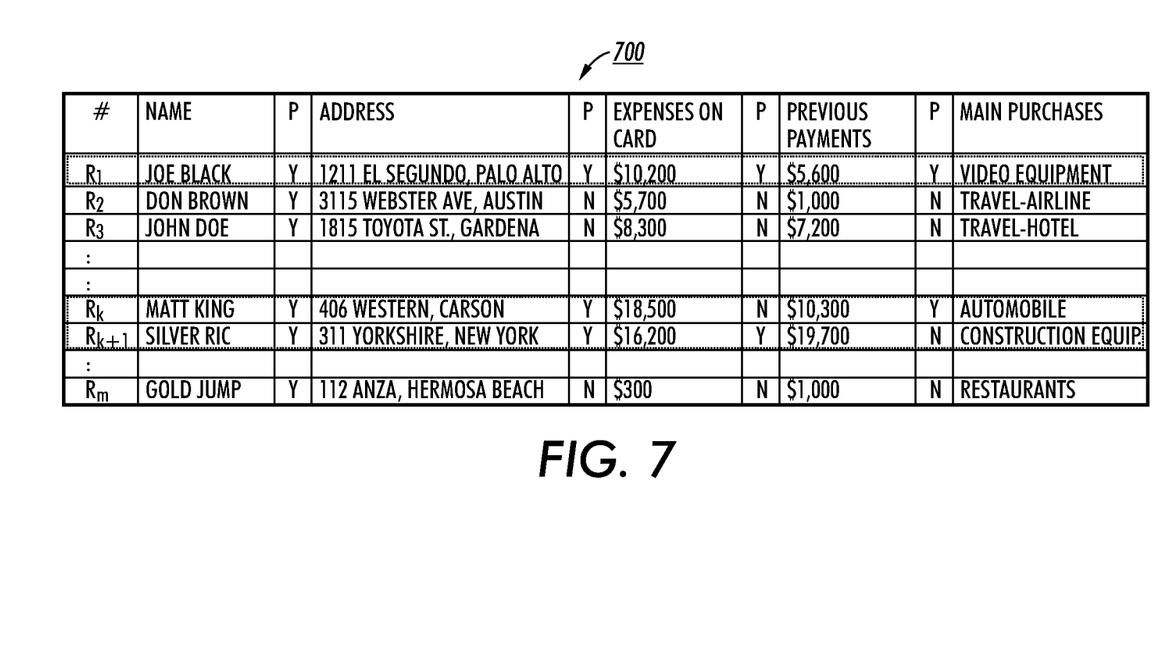
FIG. 7 shows a database of variable data records with attached privacy tags.

FIG. 7 shows an example of a sample of a set of data records 700 that might be sent by a credit card company to a printer capable of performing variable printing. Each record is a row of the table and each field of the record is shown as a column in the table in FIG. 7, is tagged with a privacy bit.

In the example of FIG. 7, each record in the set of data records 700 may include a record number that uniquely identifies the record, such as a customer's account number or a serial number. Moreover, each record in the set of data records 700 may include the customer name and a privacy bit or field associated with the customer name. Furthermore, each record in the set of data records 700 may include the customer's address and a privacy bit or field associated with the customer address. Also, each record in the set of data records 700 may include the monthly expenses on the card, an associated privacy bit or field, and a usage control requirement for each record.

If the privacy bit or field is turned OFF (i.e., information is public domain), indicated as "Y" in FIG. 7, the privacy bit or field indicates that the corresponding field is not encrypted and can be stored by the printer for future transactional and promotional print purposes. Similarly, if the privacy bit is turned ON (i.e., information is non-public), indicated as "N" in FIG. 7, the data is to be considered private and is encrypted.

For example, with respect to record $R_1$ in FIG. 7, this record has the Y status on each field and therefore there are no restrictions on any of the fields of the record. With respect to records $R_2$, $R_3$, and $R_m$ in FIG. 7, these records do not allow access to the fields of the records because there is a N status for each field, thereby restricting access.

However, record $R_k$ in FIG. 7 allows access to the Name, Address, and Previous Payments fields, but leaves the Expenses field as private. Moreover, record $R_{k+1}$ in FIG. 7 allows access to the Name, Address, and Expenses fields, but leaves the Previous Payments field as private.

Digital usage requirements may be attached to each record by the credit card company. These digital usage requirements indicate how the data may be used. The printer may purchase some of the fields tagged "N" and store the fields with a digital receipt.

Figure 8:
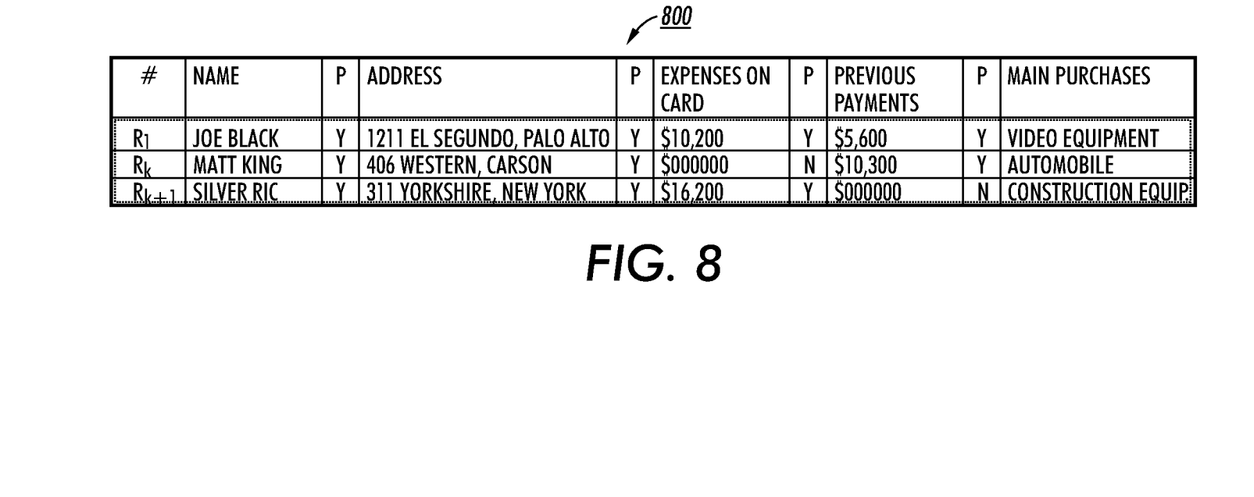
FIG. 8 shows a database of variable data records which may be stored at the processing facility having certain information masked due to privacy tags.

FIG. 8 illustrates an example of a set of data records 800 which the printer may have stored. As illustrated in FIG. 8, all the fields of record $R_1$ are available for the printer to utilize without purchase or breaching any privacy requirements.

However, as illustrated in FIG. 8, the Expenses field of record $R_k$ is masked and thus this field is not available for the printer to utilize without purchase or breaching any privacy requirements. Moreover, as illustrated in FIG. 8, the Previous Payments field of record $R_{k+1}$ is masked and thus this field is not available for the printer to utilize without purchase or breaching any privacy requirements.

One problem that might arise is if each field were uniquely encrypted. In such a case, one might need a large number of keys. For example, if there are n records and m fields per record, m*n separate keys may be needed. This number might be further multiplied by the number of separate agencies that need to access the information uniquely. This large number of keys may impose a time penalty for the processing associated with the generation of the keys.

A solution may be to pre-sort the records having based on usage control requirements and then encrypting the records as a unit.

Furthermore, it is not necessary for the keys needed to decrypt the data be actually delivered to the printer, which provides further security. Instead, the key may be delivered to a third party trusted unit. The trusted unit never discloses the key to the printer. Trusted units have trust relationships with the data provider and accept keys only from the provider. The trusted unit does not release the keys. In that way, the key never leaves the control of the data provider.

A further embodiment can include adding a facility to allow the customer access to his or her data to control the privacy permissions attached to the data.

For example, as the data enters the printer facility, a personal URL can be generated on a web server associated with the print facility. Information related to the personal URL is generated along with a printed statement, sealed, and mailed to the consumer to notify the consumer of the access to the site, to create a userid and password pair, and to enter other information the consumer may wish to reveal. This notification could also be sent via e-mail. The personal URL would allow access to the customer data via a web-based interface and could allow the customer to both add data and to control access to the data by third parties.

Figure 9:
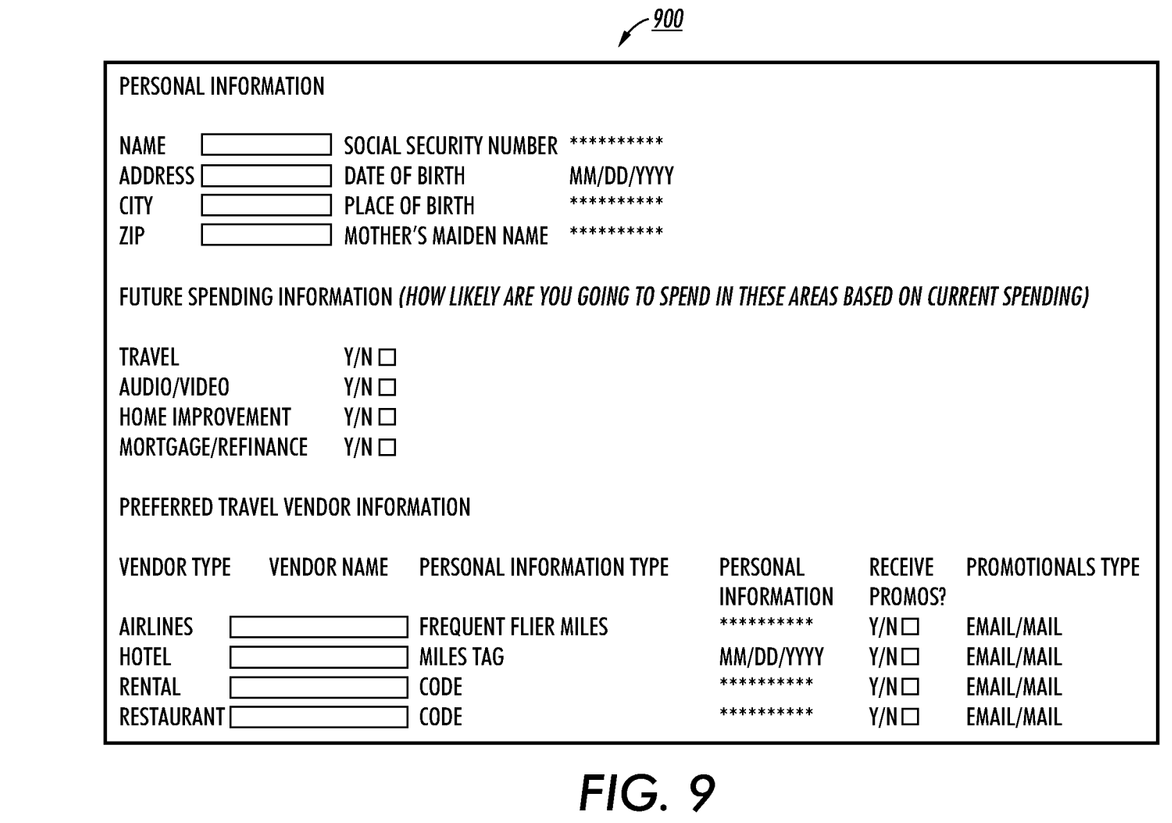
FIG. 9 shows a user interface for creating digital usage control requirements.

An example of such a web-based facility is illustrated in FIG. 9. As illustrated in FIG. 9, a user interface 900 allows the consumer to enter personal information about projected purchase habits and to select various options to receive vendor information corresponding to the projected purchase habits. It is noted that this interface may include other categories of data entry as well as modes of data entry.

Digital rights packaging enables an originating entity to define usage limits. These might include limits on how often or how many times the data may be accessed, or who may access the data. Furthermore, the digital rights can ensure that if access is allowed that the access requires payment and the rights can specify the payment amounts.

Figure 10:
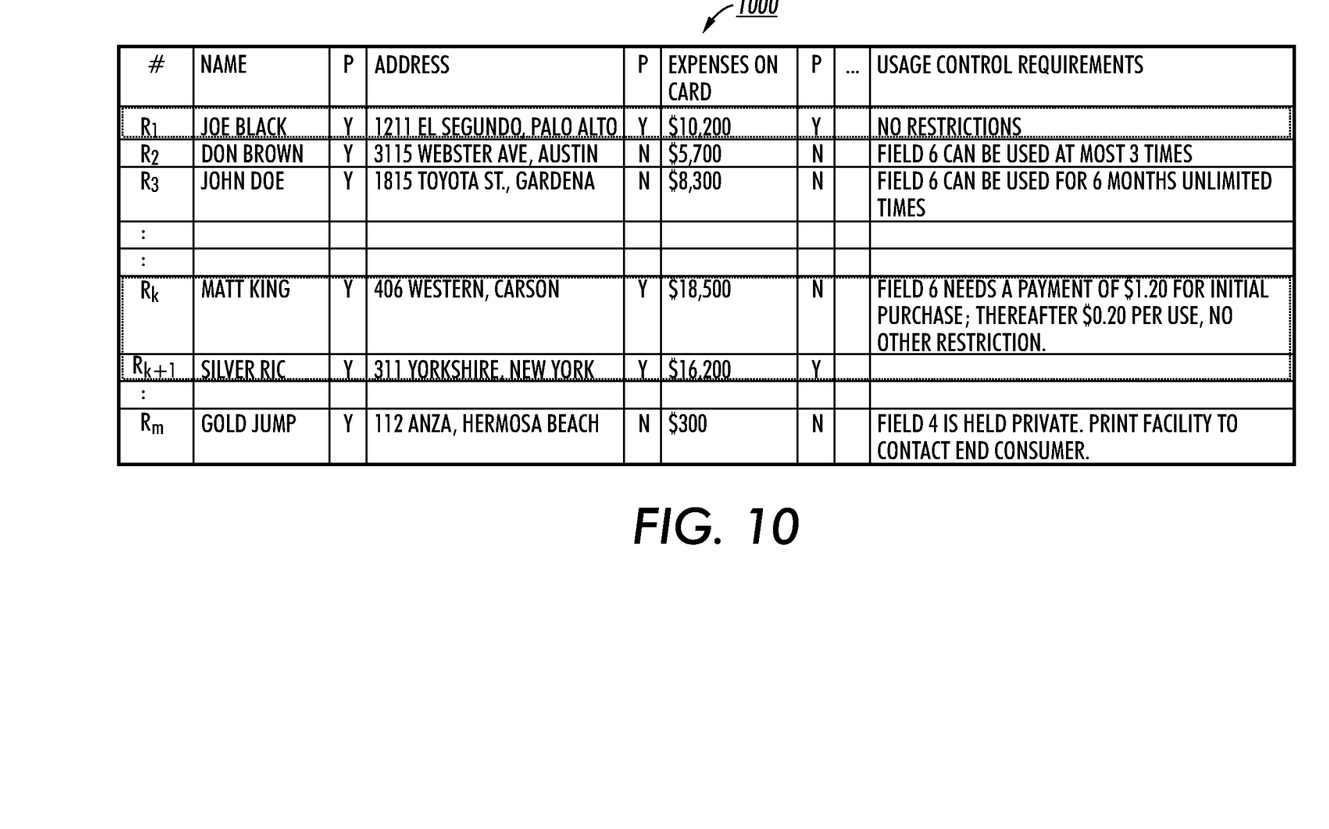
FIG. 10 shows a database of variable data records with attached privacy tags and usage control requirements for the fields with the variable data records.

An example of defining the usage limits is illustrated in FIG. 10. As illustrated in FIG. 10, a database of variable data records 1000 has attached privacy tags and usage control requirements for various fields of the variable data records.

For example, as illustrated in FIG. 10, all the fields of records $R_1$ and $R_{k+1}$ have no usage restrictions assigned thereto, and thus, the information in the fields may be available for the printer to utilize without purchase or breaching any privacy requirements.

However, as illustrated in FIG. 10, record $R_2$ has a frequency usage requirement (can be used no more than three times) attached to field 6 of record $R_2$. Moreover, as illustrated in FIG. 10, record $R_3$ has a time usage requirement (cannot be used after six months) attached to field 6 of record $R_3$. Also, as illustrated in FIG. 10, record $R_k$ has a payment requirement attached to field 6 of record $R_k$. Lastly, as illustrated in FIG. 10, record $R_m$ has a privacy requirement attached to fields of record $R_m$, requiring the contacting of the consumer.

A further embodiment could encode the variable data in such a way that it can be searched without decrypting it first using searchable encryption techniques. It is noted that regular private-key encryption does not allow searching over encrypted data. Thus, the print facility and hence a marketing agency would lose its ability to selectively retrieve records of interest when some of the fields are encrypted. Searchable encryption may be used to search through encrypted data using plain text keywords without piercing the privacy of individual information.

In summary, a method or system may print a composite document, the composite document representing a plurality of individual documents, by creating a fixed data unit for a composite document, the fixed data unit being a portion of an individual document which is consistent in each individual document within the composite document; creating a variable data unit for each individual document to be represented by the composite document, a variable data unit being a portion of the individual document which is unique to that individual document; analyzing data within each created variable data unit to determine a set of rights for each created variable data unit; embedding the determined set of rights into the appropriated created variable data unit; creating a composite document by bundling the fixed data unit with the embedded variable data units; submitting the composite document for printing; creating a plurality of individual documents for printing, each individual document being a merger of the fixed data unit with an embedded variable data unit; and printing each individual document based upon the set of rights embedded in the corresponding variable data unit.

It is noted that the determined set of rights may control a media type to be used in printing an individual document, whether the individual document is printed in color or in black/white, a font type to be used in printing an individual document, routing to a printer located in a secure location, a variable aspect of printing an individual document, and/or a finishing effect for the individual document to be printed.

It is further noted that an individual document may be routed to a printer having an appropriate media type to be used in printing an individual document, routed to a printer having appropriate marking materials when the determined set of rights indicates that the individual document is to be printed in color, routed to a printer having only black marking materials when the determined set of rights indicates that the individual document is to be printed in black/white, routed to an appropriate finisher based upon the determined set of rights, and/or routed to a printer located in a secure location.

It is also noted that the variable data units may be digitally signed and/or encrypted.

The method or system may verify the integrity of each variable data unit before printing and prevent the printing of each individual document based upon the set of rights embedded in the corresponding variable data unit when the integrity of the corresponding variable data unit has been corrupted. It is noted that a printing system may request a key to decrypt the variable data unit for the individual document received for printing and an appropriate key for decryption is sent when the printing system is appropriate with respect to the set of rights embedded in the corresponding variable data unit.

Moreover, a method or system may print a composite document, the composite document representing a plurality of individual documents, by creating a fixed data unit for a composite document, the fixed data unit being a portion of an individual document which is consistent in each individual document within the composite document; creating a variable data unit for each individual document to be represented by the composite document, a variable data unit being a portion of the individual document which is unique to that individual document; creating a set of rules for analyzing the data within each created variable data unit to determine a set of rights for each created variable data unit; creating a composite document by bundling the fixed data unit, the variable data units, and the set of rules; submitting the composite document for printing; creating a plurality of individual documents for printing, each individual document being a merger of the fixed data unit with a variable data unit; creating a set of print instructions for individual document based upon applying the set of rules to each corresponding variable data unit; and printing each individual document based upon the corresponding set of print instructions.

It is noted that the determined set of rights may control a media type to be used in printing an individual document, whether the individual document is printed in color or in black/white, a font type to be used in printing an individual document, routing to a printer located in a secure location, a variable aspect of printing an individual document, and/or a finishing effect for the individual document to be printed.

It is further noted that an individual document may be routed to a printer having an appropriate media type to be used in printing an individual document, routed to a printer having appropriate marking materials when the determined set of rights indicates that the individual document is to be printed in color, routed to a printer having only black marking materials when the determined set of rights indicates that the individual document is to be printed in black/white, routed to an appropriate finisher based upon the determined set of rights, and/or routed to a printer located in a secure location.

It is also noted that the variable data units may be digitally signed and/or encrypted.

The method or system may verify the integrity of each variable data unit before printing and prevent the printing of each individual document based upon the set of rights embedded in the corresponding variable data unit when the integrity of the corresponding variable data unit has been corrupted. It is noted that a printing system may request a key to decrypt the variable data unit for the individual document received for printing and an appropriate key for decryption is sent when the printing system is appropriate with respect to the set of rights embedded in the corresponding variable data unit.

Furthermore, a method or system may process a variable bulk-mailing job from a composite document, the composite document representing a plurality of individual documents to be mailed by creating a fixed data unit for a composite document, the fixed data unit being a portion of an individual document which is consistent in each individual document within the composite document; creating a variable data unit for each individual document to be represented by the composite document, a variable data unit being a portion of the individual document which is unique to that individual document; analyzing data within each created variable data unit to determine a set of rights for each created variable data unit, each set of rights establishing a printing operation for a corresponding individual document, a mailing procedure for the corresponding individual document, and a promotional operation for the corresponding individual document; embedding the determined set of rights into the appropriated created variable data unit; creating a composite document by bundling the fixed data unit with the embedded variable data units; submitting the composite document for printing; creating a plurality of individual documents for printing, each individual document being a merger of the fixed data unit with an embedded variable data unit; printing each individual document based upon the rights establishing a printing operation embedded in the corresponding variable data unit; obtaining a promotion item operation for each individual document based upon the rights establishing a promotional operation embedded in the corresponding variable data unit; and mailing the individual document with the corresponding promotion item using a delivery vehicle corresponding to the rights establishing a mailing procedure embedded in the corresponding variable data unit.

It is noted that the determined set of rights may control a media type to be used in printing an individual document, whether the individual document is printed in color or in black/white, a font type to be used in printing an individual document, routing to a printer located in a secure location, a variable aspect of printing an individual document, and/or a finishing effect for the individual document to be printed.

It is further noted that an individual document may be routed to a printer having an appropriate media type to be used in printing an individual document, routed to a printer having appropriate marking materials when the determined set of rights indicates that the individual document is to be printed in color, routed to a printer having only black marking materials when the determined set of rights indicates that the individual document is to be printed in black/white, routed to an appropriate finisher based upon the determined set of rights, and/or routed to a printer located in a secure location.

It is also noted that the variable data units may be digitally signed and/or encrypted.

The method or system may verify the integrity of each variable data unit before printing and prevent the printing of each individual document based upon the set of rights embedded in the corresponding variable data unit when the integrity of the corresponding variable data unit has been corrupted. It is noted that a printing system may request a key to decrypt the variable data unit for the individual document received for printing and an appropriate key for decryption is sent when the printing system is appropriate with respect to the set of rights embedded in the corresponding variable data unit.

Also, a method or system may process a variable bulk-mailing job from a composite document, the composite document representing a plurality of individual documents to be mailed by creating a fixed data unit for a composite document, the fixed data unit being a portion of an individual document which is consistent in each individual document within the composite document; creating a variable data unit for each individual document to be represented by the composite document, a variable data unit being a portion of the individual document which is unique to that individual document; creating a set of rules for analyzing the data within each created variable data unit to determine a set of rights for each created variable data unit; creating a composite document by bundling the fixed data unit, the variable data units, and the set of rules; submitting the composite document for printing; creating a plurality of individual documents for printing, each individual document being a merger of the fixed data unit with a variable data unit; creating print instructions for individual document based upon applying the set of rules to each corresponding variable data unit; creating promotional operations instructions based upon applying the set of rules to each corresponding variable data unit; creating mailing procedure instructions based upon applying the set of rules to each corresponding variable data unit; printing each individual document based upon the corresponding print instructions; obtaining a promotion item operation for each individual document based upon the corresponding promotional operations instructions; and mailing the individual document with the corresponding promotion item using a delivery vehicle corresponding to the corresponding mailing procedure instructions.

It is noted that the determined set of rights may control a media type to be used in printing an individual document, whether the individual document is printed in color or in black/white, a font type to be used in printing an individual document, routing to a printer located in a secure location, a variable aspect of printing an individual document, and/or a finishing effect for the individual document to be printed.

It is further noted that an individual document may be routed to a printer having an appropriate media type to be used in printing an individual document, routed to a printer having appropriate marking materials when the determined set of rights indicates that the individual document is to be printed in color, routed to a printer having only black marking materials when the determined set of rights indicates that the individual document is to be printed in black/white, routed to an appropriate finisher based upon the determined set of rights, and/or routed to a printer located in a secure location.

It is also noted that the variable data units may be digitally signed and/or encrypted.

The method or system may verify the integrity of each variable data unit before printing and prevent the printing of each individual document based upon the set of rights embedded in the corresponding variable data unit when the integrity of the corresponding variable data unit has been corrupted. It is noted that a printing system may request a key to decrypt the variable data unit for the individual document received for printing and an appropriate key for decryption is sent when the printing system is appropriate with respect to the set of rights embedded in the corresponding variable data unit.

A method or system may provide a secured database of personal information of clients of a first entity at a printing facility which is mineable by a second entity to generate targeted marketing communications without releasing the personal information to the second entity by creating, by the first entity, a fixed data unit for a composite document, the fixed data unit being a portion of an individual document which is consistent in each individual document within the composite document; creating, by the first entity, a variable data unit for each individual document to be represented by the composite document, a variable data unit being a portion of the individual document which is unique to that individual document; analyzing data, by the first entity, within each created variable data unit to determine a set of production rights for each created variable data unit, each set of production rights establishing a printing operation for a corresponding individual document, a mailing procedure for the corresponding individual document, a promotional operation for the corresponding individual document; analyzing data, by the first entity, within each created variable data unit to determine a set of privacy rights for individual fields of personal information within the variable data unit; embedding, by the first entity, the determined set of production rights into the appropriated created variable data unit; embedding, by the first entity, the determined set of privacy rights into the appropriated created variable data unit; creating, by the first entity, a composite document by bundling the fixed data unit with the embedded variable data units; submitting, by the first entity, the composite document to the printing facility for printing; receiving, by the printing facility, the composite document; bifurcating, by the printing facility, the composite document into the fixed data unit and the embedded variable data units; removing, by the printing facility, the determined set of production rights from each embedded variable data unit; storing, in a database at the printing facility, each variable data unit embedded with the corresponding determined set of privacy rights; receiving, by the printing facility, a communication from the second entity, the communication including a printing request to be used in creating targeted marketing communications, a search query, and authorization data for the search query; verifying, based upon the received authorization data, if the print facility has authorization to perform the search query; collecting, by the printing facility, information from the database based upon the search query when the print facility has authorization to perform the search query; and creating, by the printing facility, targeted marketing communications based upon the collected information.

It is noted that the verifying of if the print facility has authorization to perform the search query may include verifying if the first entity has authorized the second entity to search embedded variable data units associated with the first entity; verifying if the client of the first entity has authorized the second entity to search embedded variable data units associated with the client of the first entity; and/or preventing authorization until the first entity has received appropriate compensation.

It is further noted that the determined set of privacy rights may provide multiple levels of privacy for individual fields of personal information within the variable data unit wherein the determined set of privacy rights may be based upon criteria established by the first entity, the client of the first entity and/or both the first entity and the client of the first entity.

The method or system may further create, by the printing facility for the first entity, a plurality of individual documents for printing, each individual document being a merger of the fixed data unit with a variable data unit; create, by the printing facility for the first entity, print instructions for individual document based upon applying the set of rules to each corresponding variable data unit; create, by the printing facility for the first entity, promotional operations instructions based upon applying the set of rules to each corresponding variable data unit; create, by the printing facility for the first entity, mailing procedure instructions based upon applying the set of rules to each corresponding variable data unit; print, by the printing facility for the first entity, each individual document based upon the corresponding print instructions; obtain, by the printing facility for the first entity, a promotion item operation for each individual document based upon the corresponding promotional operations instructions; and/or mail, by the printing facility for the first entity, the individual document with the corresponding promotion item using a delivery vehicle corresponding to the corresponding mailing procedure instructions.

The method or system may also send a communication to each client of the first entity having an associated embedded variable data unit stored in the database informing the client of the first entity of information being stored for marketing mining purposes; provide each client of the first entity a means to designate the privacy rights for each individual field of personal information within the stored variable data unit; and/or update the privacy rights for each individual field of personal information within the corresponding stored variable data unit based upon designations provided by the client of the first entity.

It is noted that the means to designate the privacy rights for each individual field of personal information within the stored variable data unit may be web based.

A method or system may provide a secured database of personal information of clients of a first entity at a printing facility which is mineable by a second entity to generate targeted marketing communications without releasing the personal information to the second entity by creating, by the first entity, a fixed data unit for a composite document, the fixed data unit being a portion of an individual document which is consistent in each individual document within the composite document; creating, by the first entity, a variable data unit for each individual document to be represented by the composite document, a variable data unit being a portion of the individual document which is unique to that individual document; analyzing data, by the first entity, within each created variable data unit to determine a set of production rights for each created variable data unit, each set of production rights establishing a printing operation for a corresponding individual document, a mailing procedure for the corresponding individual document, a promotional operation for the corresponding individual document; analyzing data, by the first entity, within each created variable data unit to determine a privacy status of individual fields of personal information within the variable data unit; embedding, by the first entity, the determined set of production rights into the appropriated created variable data unit; encrypting, by the first entity, individual fields of personal information within the variable data unit when the privacy status of the field is non-public; creating, by the first entity, a composite document by bundling the fixed data unit with the embedded variable data units; submitting, by the first entity, the composite document to the printing facility for printing; receiving, by the printing facility, the composite document; bifurcating, by the printing facility, the composite document into the fixed data unit and the embedded variable data units; removing, by the printing facility, the determined set of production rights from each embedded variable data unit; storing, in a database at the printing facility, each variable data unit having encrypted individual fields of personal information within the variable data unit; receiving, by the printing facility, a communication from the second entity, the communication including a printing request to be used in creating targeted marketing communications, a search query, and authorization data for the search query; verifying, with the first client based upon the received authorization data, if the print facility has authorization to perform the search query and generate targeted marketing communications therefrom; receiving a decryption key from the first client when the print facility has authorization to perform the search query and generate targeted marketing communications therefrom; collecting, by the printing facility using the received decryption key, information from the database based upon the search query when the print facility has authorization to perform the search query; and creating, by the printing facility, targeted marketing communications based upon the collected information.

It is noted that the verifying of if the print facility has authorization to perform the search query may include verifying if the first entity has authorized the second entity to search embedded variable data units associated with the first entity; verifying if the client of the first entity has authorized the second entity to search embedded variable data units associated with the client of the first entity; and/or preventing authorization until the first entity has received appropriate compensation.

It is further noted that the determined set of privacy rights may provide multiple levels of privacy for individual fields of personal information within the variable data unit wherein the determined set of privacy rights may be based upon criteria established by the first entity, the client of the first entity and/or both the first entity and the client of the first entity.

The method or system may further create, by the printing facility for the first entity, a plurality of individual documents for printing, each individual document being a merger of the fixed data unit with a variable data unit; create, by the printing facility for the first entity, print instructions for individual document based upon applying the set of rules to each corresponding variable data unit; create, by the printing facility for the first entity, promotional operations instructions based upon applying the set of rules to each corresponding variable data unit; create, by the printing facility for the first entity, mailing procedure instructions based upon applying the set of rules to each corresponding variable data unit; print, by the printing facility for the first entity, each individual document based upon the corresponding print instructions; obtain, by the printing facility for the first entity, a promotion item operation for each individual document based upon the corresponding promotional operations instructions; and/or mail, by the printing facility for the first entity, the individual document with the corresponding promotion item using a delivery vehicle corresponding to the corresponding mailing procedure instructions.

The method or system may also send a communication to each client of the first entity having an associated embedded variable data unit stored in the database informing the client of the first entity of information being stored for marketing mining purposes; provide each client of the first entity a means to designate the privacy rights for each individual field of personal information within the stored variable data unit; and/or update the privacy rights for each individual field of personal information within the corresponding stored variable data unit based upon designations provided by the client of the first entity.

It is noted that the means to designate the privacy rights for each individual field of personal information within the stored variable data unit may be web based.

A method or system may provide a secured database of personal information of clients of a first entity at a printing facility which is mineable by a second entity without releasing the personal information to the second entity by creating, by the first entity, a fixed data unit for a composite document, the fixed data unit being a portion of an individual document which is consistent in each individual document within the composite document; creating, by the first entity, a variable data unit for each individual document to be represented by the composite document, a variable data unit being a portion of the individual document which is unique to that individual document; analyzing data, by the first entity, within each created variable data unit to determine a set of production rights for each created variable data unit, each set of production rights establishing a printing operation for a corresponding individual document, a mailing procedure for the corresponding individual document, a promotional operation for the corresponding individual document; analyzing data, by the first entity, within each created variable data unit to determine a privacy status of individual fields of personal information within the variable data unit; embedding, by the first entity, the determined set of production rights into the appropriated created variable data unit; encrypting, by the first entity, individual fields of personal information within the variable data unit when the privacy status of the field is non-public; creating, by the first entity, a composite document by bundling the fixed data unit with the embedded variable data units; submitting, by the first entity, the composite document to the printing facility for printing; receiving, by the printing facility, the composite document; bifurcating, by the printing facility, the composite document into the fixed data unit and the embedded variable data units; removing, by the printing facility, the determined set of production rights from each embedded variable data unit; storing, in a database at the printing facility, each variable data unit having encrypted individual fields of personal information within the variable data unit; receiving, by the printing facility, a communication from the second entity, the communication including a search query; searching, by the printing facility, the database to determine if the database includes information corresponding to the search query; and informing the second entity whether the database includes information corresponding to the search query without providing the actual information from the database to the second entity.

It is noted that the method or system may request, by the second entity, that print facility generate targeted marketing communications based upon the information corresponding to the search query; verify, with the first client based upon the received request from the second entity, if the print facility has authorization to generate the requested targeted marketing communications therefrom; receive a decryption key from the first client when the print facility has authorization to generate targeted marketing communications therefrom; and/ or create, by the printing facility, targeted marketing communications based upon the collected information.

It is noted that the verifying of if the print facility has authorization to perform the search query may include verifying if the first entity has authorized the second entity to search embedded variable data units associated with the first entity; verifying if the client of the first entity has authorized the second entity to search embedded variable data units associated with the client of the first entity; and/or preventing authorization until the first entity has received appropriate compensation.

It is further noted that the determined set of privacy rights may provide multiple levels of privacy for individual fields of personal information within the variable data unit wherein the determined set of privacy rights may be based upon criteria established by the first entity, the client of the first entity and/or both the first entity and the client of the first entity.

The method or system may further create, by the printing facility for the first entity, a plurality of individual documents for printing, each individual document being a merger of the fixed data unit with a variable data unit; create, by the printing facility for the first entity, print instructions for individual document based upon applying the set of rules to each corresponding variable data unit; create, by the printing facility for the first entity, promotional operations instructions based upon applying the set of rules to each corresponding variable data unit; create, by the printing facility for the first entity, mailing procedure instructions based upon applying the set of rules to each corresponding variable data unit; print, by the printing facility for the first entity, each individual document based upon the corresponding print instructions; obtain, by the printing facility for the first entity, a promotion item operation for each individual document based upon the corresponding promotional operations instructions; and/or mail, by the printing facility for the first entity, the individual document with the corresponding promotion item using a delivery vehicle corresponding to the corresponding mailing procedure instructions.

The method or system may also send a communication to each client of the first entity having an associated embedded variable data unit stored in the database informing the client of the first entity of information being stored for marketing mining purposes; provide each client of the first entity a means to designate the privacy rights for each individual field of personal information within the stored variable data unit; and/or update the privacy rights for each individual field of personal information within the corresponding stored variable data unit based upon designations provided by the client of the first entity.

It is noted that the means to designate the privacy rights for each individual field of personal information within the stored variable data unit may be web based. A method and system provides a secured database of personal information of clients of a first entity at a printing facility which is mineable by a second entity to generate targeted marketing communications without releasing the personal information to the second entity by creating a fixed data unit for a composite document, the fixed data unit being a portion of an individual document which is consistent in each individual document within the composite document; creating, by the first entity, a variable data unit for each individual document to be represented by the composite document, a variable data unit being a portion of the individual document which is unique to that individual document; analyzing data, by the first entity, within each created variable data unit to determine a set of production rights for each created variable data unit, each set of production rights establishing a printing operation for a corresponding individual document, a mailing procedure for the corresponding individual document, a promotional operation for the corresponding individual document; analyzing data, by the first entity, within each created variable data unit to determine a set of privacy rights for individual fields of personal information within the variable data unit; embedding, by the first entity, the determined set of production rights into the appropriated created variable data unit; embedding, by the first entity, the determined set of privacy rights into the appropriated created variable data unit; and transferring the fixed data units and the embedded variable data units to the print facility.

Also, a method and system provides a secured database of personal information of clients of a first entity at a printing facility which is mineable by a second entity to generate targeted marketing communications without releasing the personal information to the second entity by creating a fixed data unit for a composite document, the fixed data unit being a portion of an individual document which is consistent in each individual document within the composite document; creating, by the first entity, a variable data unit for each individual document to be represented by the composite document, a variable data unit being a portion of the individual document which is unique to that individual document; analyzing data, by the first entity, within each created variable data unit to determine a set of production rights for each created variable data unit, each set of production rights establishing a printing operation for a corresponding individual document, a mailing procedure for the corresponding individual document, a promotional operation for the corresponding individual document; analyzing data, by the first entity, within each created variable data unit to determine a privacy status of individual fields of personal information within the variable data unit; embedding, by the first entity, the determined set of production rights into the appropriated created variable data unit; encrypting, by the first entity, individual fields of personal information within the variable data unit when the privacy status of the field is non-public; and transferring the fixed data units and the embedded variable data units to the print facility.

Furthermore, a method and system provides a secured database of personal information of clients of a first entity at a printing facility which is mineable by a second entity without releasing the personal information to the second entity by creating a fixed data unit for a composite document, the fixed data unit being a portion of an individual document which is consistent in each individual document within the composite document; creating, by the first entity, a variable data unit for each individual document to be represented by the composite document, a variable data unit being a portion of the individual document which is unique to that individual document; analyzing data, by the first entity, within each created variable data unit to determine a set of production rights for each created variable data unit, each set of production rights establishing a printing operation for a corresponding individual document, a mailing procedure for the corresponding individual document, a promotional operation for the corresponding individual document; analyzing data, by the first entity, within each created variable data unit to determine a privacy status of individual fields of personal information within the variable data unit; embedding, by the first entity, the determined set of production rights into the appropriated created variable data unit; encrypting, by the first entity, individual fields of personal information within the variable data unit when the privacy status of the field is non-public; and transferring the fixed data units and the embedded variable data units to the print facility.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for printing a composite document, the composite document representing a plurality of individual documents, comprising:
    creating a fixed data unit for a composite document, the fixed data unit being a portion of an individual document which is consistent in each individual document within the composite document;
    creating a variable data unit for each individual document to be represented by the composite document, a variable data unit being a portion of the individual document which is unique to that individual document;
    analyzing data within each created variable data unit to determine a set of rights for each created variable data unit;
    embedding the determined set of rights into the appropriated created variable data unit;
    creating a composite document by associating the fixed data unit with the embedded variable data units;
    submitting the composite document for printing;
    creating a plurality of individual documents for printing, each individual document being a merger of the fixed data unit with an embedded variable data unit; and
    printing each individual document based upon the set of rights embedded in the corresponding variable data unit.

2. The method as claimed in claim 1, wherein the determined set of rights controls a media type to be used in printing an individual document.

3. The method as claimed in claim 2, wherein an individual document is routed to a printer having an appropriate media type to be used in printing an individual document.

4. The method as claimed in claim 1, wherein the determined set of rights controls whether the individual document is printed in color or in black/white.

5. The method as claimed in claim 4, wherein an individual document is routed to a printer having appropriate marking materials when the determined set of rights indicates that the individual document is to be printed in color.

6. The method as claimed in claim 4, wherein an individual document is routed to a printer having only black marking materials when the determined set of rights indicates that the individual document is to be printed in black/white.

7. The method as claimed in claim 1, wherein the determined set of rights controls a font type to be used in printing an individual document.

8. The method as claimed in claim 1, wherein the determined set of rights controls a finishing effect for the individual document to be printed.

9. The method as claimed in claim 8, wherein an individual document is routed to an appropriate finisher based upon the determined set of rights.

10. The method as claimed in claim 1, wherein the variable data units are digitally signed.

11. The method as claimed in claim 10, further comprising:
    verifying an integrity of each variable data unit before printing; and
    preventing the printing of each individual document based upon the set of rights embedded in the corresponding variable data unit when the integrity of the corresponding variable data unit has been corrupted.

12. The method as claimed in claim 1, wherein the variable data units are encrypted.

13. The method as claimed in claim 12, wherein a printing system requests a key to decrypt the variable data unit for the individual document received for printing and an appropriate key for decryption is sent when the printing system is appropriate with respect to the set of rights embedded in the corresponding variable data unit.

14. The method as claimed in claim 1, wherein the determined set of rights controls routing to a printer located in a secure location.

15. The method as claimed in claim 1, wherein the determined set of rights controls a variable aspect of printing an individual document.

\* \* \* \* \*